(12) United States Patent
Ito et al.

(10) Patent No.: US 6,950,769 B2
(45) Date of Patent: Sep. 27, 2005

(54) ENCODER SIGNAL INTERPOLATION DIVIDER

(75) Inventors: Yoshinori Ito, Nagano-ken (JP); Sadaharu Kanamori, Nagano-ken (JP); Muneo Mitamura, Nagano-ken (JP)

(73) Assignee: Harmonic Drive Systems, Inc., Tokyo (JP)

( * ) Notice: Subject to any disclaimer, the term of this patent is extended or adjusted under 35 U.S.C. 154(b) by 7 days.

(21) Appl. No.: 10/819,206

(22) Filed: Apr. 7, 2004

(65) Prior Publication Data

US 2004/0260499 A1 Dec. 23, 2004

(30) Foreign Application Priority Data

Apr. 30, 2003 (JP) ............................. 2003-125338

(51) Int. Cl.$^7$ .................... G01C 25/00; G01D 18/00; G01F 25/00

(52) U.S. Cl. .................................................. 702/104

(58) Field of Search ............................. 702/85, 94, 95, 702/104, 150–153, 161, 163, 189; 341/111–116

(56) References Cited

U.S. PATENT DOCUMENTS 6,556,153 B1 * 4/2003 Cardamone ................. 341/111

FOREIGN PATENT DOCUMENTS

| JP | 49-106744 | 10/1974 |
| JP | 06-167354 A | 6/1994 |

* cited by examiner

Primary Examiner—Michael Nghiem
(74) Attorney, Agent, or Firm—Burns, Doane, Swecker & Mathis, L.L.P.

(57) ABSTRACT

In an encoder signal interpolation divider (1) that automatically corrects errors in the offset and gain of an input signal at a high speed with a low cost circuit configuration, and can accurately generate an encoder signal having a predetermined resolution by interpolation division, analog input signals (A1, B1) are subjected to offset correction by a 0-point correction circuit (13) in adders (4, 5) prior to being digitally converted by A/D converters (8, 9), and are subjected to gain correction by an amplitude correction circuit (14) in amplifiers (6, 7). The corrected analog signals are converted to digital values, angle data is calculated in an angle data lookup table (10), and, based on these results, an encoder pulse signal having a predetermined resolution is generated and output from an encoder pulse signal generating circuit (12).

1 Claim, 2 Drawing Sheets

ENCODER SIGNAL INTERPOLATION DIVIDER

BACKGROUND OF THE INVENTION

1. Field of the Invention

The present invention relates to an encoder for detecting a rotational angular position of a motor, a position of a moving worktable, and the like. More specifically, the present invention relates to an encoder signal interpolation divider that automatically corrects errors in the offset, gain level, and gain balance of an input signal at a high speed with a low cost circuit configuration, and can accurately generate an encoder signal having a predetermined resolution by interpolation division.

2. Description of the Related Art

A sensor of an encoder generally outputs two-phase signals composed of A-phase signals (sinusoidal signals) and B-phase signals (cosinusoidal signals). In a rotary encoder, for example, the output voltages A and B of these signals *A and *B are $$A = K \sin \theta$$

$$B = K \cos \theta$$

in accordance with the rotational angle $\theta$ of the rotational shaft of the detection object. If the values A and B at a certain moment are respectively designated as a and b, the angle $\theta$ (electrical angle) at that moment can be read from the values a and b, as shown in FIG. 1. Based on the angle $\theta$ thus read, two-phase encoder pulse signals having a predetermined resolution can be generated, and the mechanical angle of the rotational shaft can be detected based on such pulse signals.

In encoders for generating two-phase encoder pulse signals with a predetermined resolution on the basis of two-phase sinusoidal signals, an interpolation division system using A/D conversion is known as a technique for electrically processing and enhancing the resolution of two-phase sinusoidal signals (sinusoidal signal and cosinusoidal signal) The system is disclosed in JP-A 49-106744.

Here, angle $\theta$ is calculated based on the assumption that the central value of the voltage and the maximum amplitude of A-phase and B-phase signals obtained from the sensor of an encoder are constant. In an actual encoder, however, the balance of the output voltage of each phase may be disrupted or variations may be induced in the center voltage values thereof by shifts in the mechanical position, temperature-induced fluctuations in the electrical circuit constant, or the like. (The former is referred to as "gain balance," and the latter is referred to as "offset balance.")

For example, if the offset balance changes 2%, the calculated error is 2.3° (electrical angle error). In actual encoders, several thousands to several tens of thousands of reference signals are output when a rotational shaft rotates once, the shaft conversion error (mechanical angle error) is calculated by the equation below, and the error is 0.5 arc-sec when the offset balance changes 2% in an encoder in which the number of reference pulses is 18,000.

(Mechanical angle error)= (Electrical angle error)/
(Number of signal outputs per rotation)

The resolution by interpolation division is normally 100 to 400 times the number of reference pulses, so if it is assumed that an encoder output of 18,000 pulses is divided to become 200 times greater, then the resolution will be 3,600,000 pulses, and one pulse will correspond to 0.36 arc-sec. The offset error calculated above is an error of one or more pulses, so the offset error must be compensated.

A system for compensating for fluctuations in the A-phase and B-phase signals is described, for example, in JP-A 6-167354. In the interpolation processing device cited therein, the correction value of the offset gain is added to a digital value obtained by converting the input signal from analog to digital format, and offset correction is performed. Thus, in the interpolation processing device, correction processing for the input signal is realized with a digital circuit.

SUMMARY OF THE INVENTION

An object of the present invention is to provide an encoder signal interpolation divider that automatically corrects errors in the offset, gain level, and gain balance of an input signal at a high speed with a low cost circuit configuration, and can accurately generate an encoder signal having a predetermined resolution by interpolation division.

To solve the above problems in accordance with the present invention, there is provided an encoder signal interpolating divider for computing an electrical angle from sinusoidal signals with a 90-degree phase difference, and outputting two-phase encoder pulse signals having a predetermined resolution by interpolation division, comprising:

an A/D converter for converting the sinusoidal signals into corresponding digital values, angle data calculation means for calculating angle data that corresponds to the digital values of the sinusoidal signals by interpolation division, encoder signal generation means for generating the two-phase encoder pulse signals having a predetermined resolution based on the calculated angle data, offset correction means for calculating digital correction values for setting the offset of the sinusoidal signals to zero based on the digital values of the sinusoidal signals, and for using an analog conversion value of the digital correction values to carry out offset correction of the sinusoidal signals that are input to the A/D converter, gain correction means for calculating gain correction values for the sinusoidal signals based on the digital values of the sinusoidal signals, and for carrying out gain correction of the sinusoidal signals that are input to the A/D converter.

According to the present invention, input signals (two-phase sinusoidal signals) are converted from analog to digital format, a correction value for setting the offset thereof to zero is computed, and the correction value is thereafter converted to an analog value and then returned to the A/D converter. In other words, the input analog signal (sinusoidal signal) itself is corrected. Therefore, a processing circuit for correcting the input signal by digital processing is not required, so the load on the processing circuit is reduced, and interpolation processing can be accelerated. Also, the capacity of the CPU, the gate array, and other components can be reduced, and the processing circuit can therefore be manufactured at low cost.

DESCRIPTION OF THE PREFERRED EMBODIMENTS

An example of an encoder signal interpolation divider according to the present invention will be described with reference to the drawings.

Figure 1:
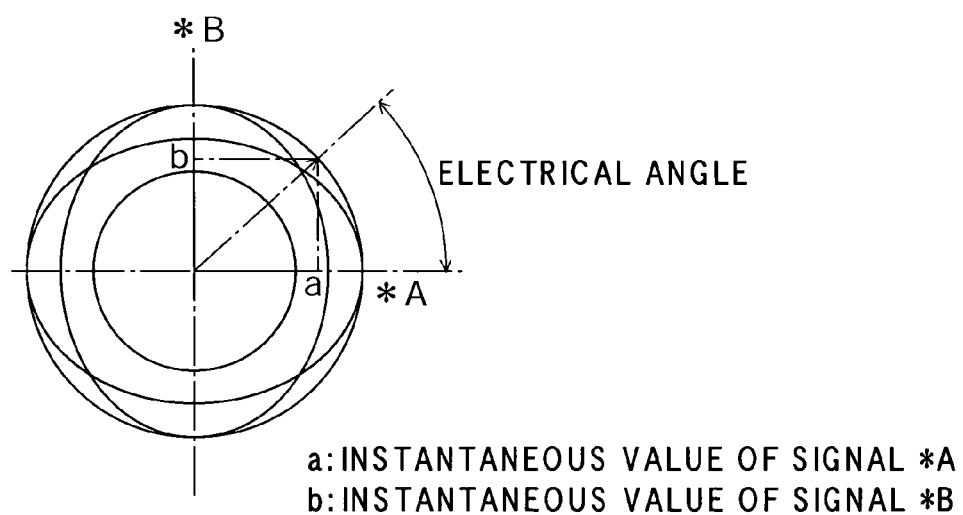
FIG. 1 is a diagram depicting the principle for computing an electrical angle from sinusoidal signals with a 90-degree phase difference.
Figure 2:
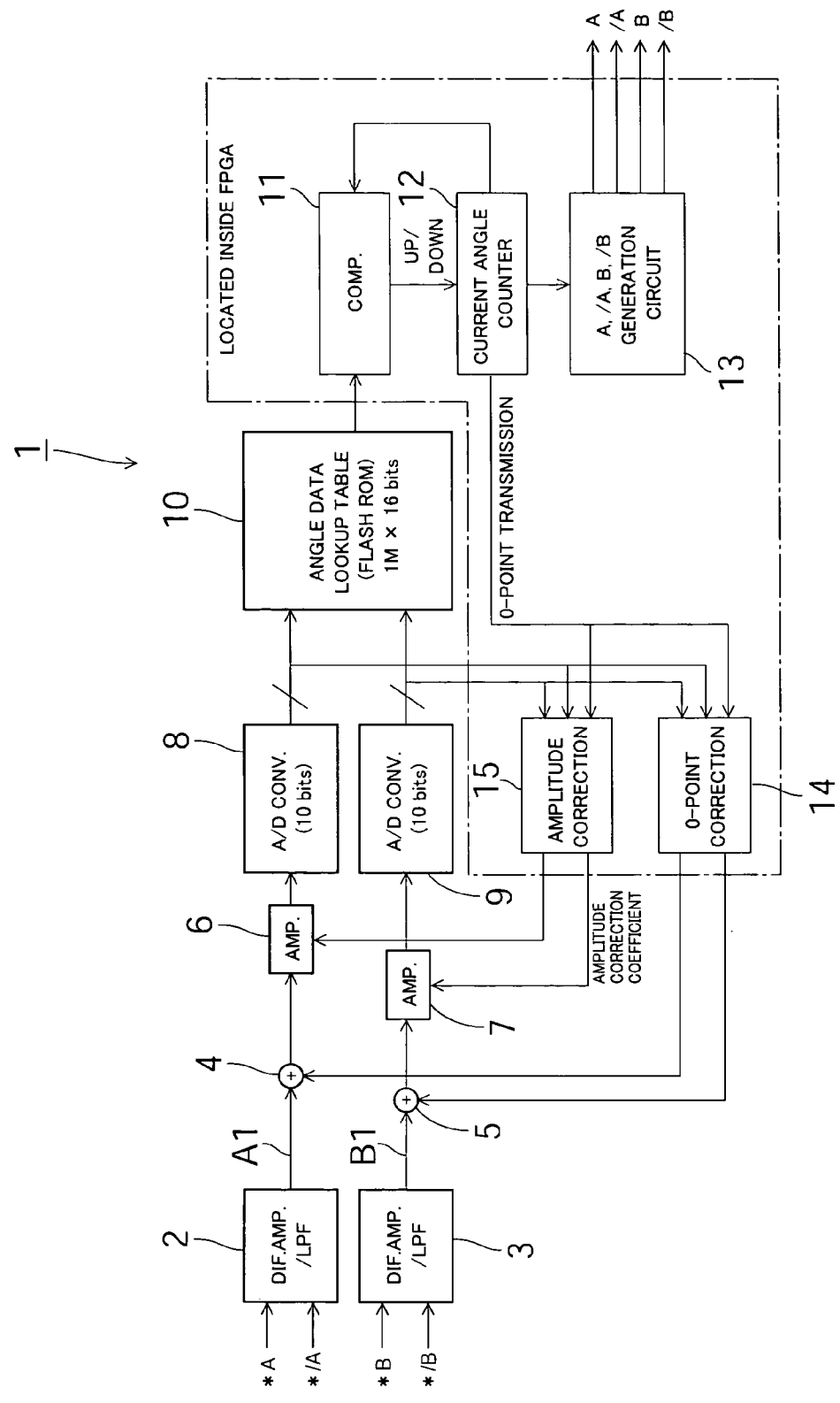
FIG. 2 is a schematic block diagram of an encoder signal interpolation divider in which the present invention has been applied.

FIG. 2 is a schematic block diagram depicting an encoder signal interpolation divider of the present example. The encoder signal interpolation divider 1 receives sinusoidal signals from a sensor (not depicted) that generates the sinusoidal signals with a 90-degree phase difference according to the rotation of a rotational shaft to be detected (not depicted), for example. In the present example, an A-phase signal (sinusoidal signal) *A, a reversed signal */A thereof, a B-phase signal (cosinusoidal signal) *B, and a reversed signal */B thereof are input to the divider 1.

Signals *A and */A are input to a differential amplifier 2, and a differential signal A1 thereof is generated. Signals *B and */B are also input to a differential amplifier 3, and a differential signal B1 thereof is generated. The differential signals A1 and B1 are subjected to offset correction in adders 4 and 5, and are then subjected to gain correction in amplifiers 6 and 7. The corrected signals are then converted into digital signals in A/D converters 8 and 9.

Based on these digital signals, a lookup table stored in advance in an angle data lookup table 10 is searched, and the corresponding angle data is calculated by interpolation division.

The calculated angle data is compared with a current value stored in a current angle counter 12 in order to compensate for data continuity in a comparator circuit 11. The value of the current angle counter 12 is thereafter increased or decreased to yield calculated angle data. An A-phase encoder pulse signal A, a reversed signal /A thereof, a B-phase signal B, and a reversed signal /B thereof, which correspond to the content of the current angle counter 12, are then generated and output in an encoder pulse signal generation circuit 13.

Here, the offset of the differential signals A1 and B1 of the sinusoidal signals, which are the input signals, is corrected by means of a 0-point correction circuit 14. In the 0-point correction circuit 14, the average of the offset values of the input signals is calculated as a 0-point correction value (offset correction value) on the basis of the digital output values of the A/D converters 8 and 9 and on the basis of a signal for indicating the 0-point transmission timing supplied from the current angle counter 12, and the 0-point correction value is converted to an analog signal and is then fed to the adders 3 and 4. As a result, the offsets of the input signals A1 and B1 are corrected in the adders 3 and 4.

Also, the gain of the input signals A1 and B1 is corrected by means of an amplitude correction circuit 15. In the amplitude correction circuit 15, the average of the maximum amplitude values of the input signals is computed on the basis of the digital output values of the A/D converters 8 and 9 and on the basis of a signal for indicating the 0-point transmission timing supplied from the current angle counter 12, and an amplitude correction coefficient for correcting this to the target amplitude value is calculated. Input signals a and b are amplified in the amplifiers 6 and 7 on the basis of the calculated amplitude correction coefficient, and the gain of the input signals is thereby adjusted.

In the encoder signal interpolation divider 1 of the present example thus configured, the inputted analog signals (sinusoidal signals) A1 and B1 are corrected as such before being digitally converted. Therefore, a processing circuit for correcting the digitized input signal by digital processing is not required, so the load on the processing circuit is lightened, and interpolation processing can be accelerated. Also, the capacity of the CPU, the gate array, and other components can be reduced, and the processing circuit can therefore be manufactured at low cost.

In the divider of the present example, a 10-bit converter, for example, is used for the A/D converters 8 and 9, and a flash ROM with a 1 M×16-bit configuration is used for the angle data lookup table 10, but the resolution of the generated encoder pulse signal can easily be improved by increasing the number of bits and the data capacity thereof.

Furthermore, even if the input signals are not accurate sinusoidal or cosinusoidal signals, correction can still be carried out by means of the angle data lookup table 10 as long as the waveform is known.

As described above, in the encoder signal interpolation divider of the present invention, an input signal directly undergoes offset correction and gain correction prior to being digitally converted. Therefore, a processing circuit for correcting the input signal by digital processing is not required, so the load on the processing circuit is lightened, and interpolation processing can be accelerated. Also, the capacity of the CPU, the gate array, and other components can be reduced, and the processing circuit can therefore be manufactured at low cost. Hence, errors in the offset, gain level, and gain balance of an input signal can be automatically corrected at a high speed with a low cost circuit configuration, and an encoder signal interpolation divider capable of accurately generating an encoder signal having a predetermined resolution by interpolation division can be realized.

What is claimed is:

1. An encoder signal interpolating divider for computing an electrical angle from sinusoidal signals with a 90-degree phase difference, and outputting two-phase encoder pulse signals having a predetermined resolution by interpolation division, comprising:

an A/D converter for converting the sinusoidal signals into corresponding digital values, angle data lookup means for looking up angle data that corresponds to the digital values of the sinusoidal signals by interpolation division, encoder signal generation means for generating the two-phase encoder pulse signals having a predetermined resolution based on the calculated angle data, offset correction means for calculating digital correction values for setting the offset of the sinusoidal signals to zero based on the digital values of the sinusoidal signals, and for using an analog conversion value of the digital correction values to carry out offset correction of the sinusoidal signals that are input to the A/D converter, and gain correction means for calculating gain correction values for the sinusoidal signals based on the digital values of the sinusoidal signals, and for carrying out gain correction of the sinusoidal signals that are input to the A/D converter.

* * * * *